(12) United States Patent
Bereiter

(10) Patent No.: US 6,185,606 B1
(45) Date of Patent: Feb. 6, 2001

(54) ADAPTIVE MESSAGING METHOD, SYSTEM AND COMPUTER PROGRAM PRODUCT

(75) Inventor: Thomas William Bereiter, Austin, TX (US)

(73) Assignee: Motive Communications, Inc., Austin, TX (US)

( * ) Notice: Under 35 U.S.C. 154(b), the term of this patent shall be extended for 0 days.

(21) Appl. No.: 09/189,328

(22) Filed: Nov. 9, 1998

(51) Int. Cl.⁷ .................................................. G06F 13/00
(52) U.S. Cl. ............................................................ 709/206
(58) Field of Search ................................... 709/206, 203

(56) References Cited

U.S. PATENT DOCUMENTS

| | | | |
|---|---|---|---|
| 5,781,901 | * | 7/1998 | Kuzma .................................. 707/10 |
| 5,805,298 | * | 9/1998 | Ho et al. ............................. 358/1.15 |
| 5,974,449 | * | 10/1999 | Chang et al. ........................ 709/206 |
| 6,081,832 | * | 6/2000 | Gilchrist et al. ..................... 709/206 |
| 6,105,056 | * | 7/1998 | Gilchrist et al. ..................... 709/206 |

* cited by examiner

Primary Examiner—Kenneth R. Coulter
(74) Attorney, Agent, or Firm—Skjerven Morrill MacPherson, LLP; Stephen A. Terrile

(57) ABSTRACT

A method, system and computer program product for adaptive messaging in a computer network having a client machine and at least one server. Typically, the client machine is located behind a firewall. According to the invention, a communication from the server to the client may be "repackaged" in an e-mail message in the event a point-to-point connection between the server and the client cannot be established due to the firewall or some other network constraint. The client typically communicates with the server by the point-to-point connection. The technique is especially useful in an automated diagnostic method wherein users of client machines interact with a diagnostic system located at a server.

16 Claims, 3 Drawing Sheets

ADAPTIVE MESSAGING METHOD, SYSTEM AND COMPUTER PROGRAM PRODUCT

BACKGROUND OF THE INVENTION

1. Technical Field

The present invention relates generally to electronic communications across firewalls or poorly-connected computer networks.

2. Description of the Related Art

Enterprise messaging requirements are evolving beyond traditional store-and-forward e-mail to integrate with the Web-based "browsing" model of corporate intranets. Moreover, existing messaging infrastructure is being extended beyond the enterprise to business partners, customers and suppliers. This requirement, however, conflicts with the enterprise's need to secure its network and information. This security is traditionally accomplished using a firewall.

Traditional client-server communication systems require a point-to-point network connection, such as TCP/IP or token ring, between the two parties to a network communication. If one of the parties is behind a network firewall, or if the two parties do not share a common point-to-point protocol, then a connection cannot be made. A similar problem also exists when two parties have a poor network connection.

The present invention addresses this problem.

BRIEF SUMMARY OF THE INVENTION

It is a primary object of this invention to implement an adaptive messaging system that enables machines separated by firewalls and poorly-connected networks to communicate effectively.

It is another primary object of this invention to use an e-mail communication as a means to encapsulate and deliver a message that has otherwise been undeliverable through a firewall.

It is still another object of this invention to enable a given messaging system operable between a pair of machines to have the appearance of a "point-to-point" connection even though the actual connection is effected using an alternative method, such as a set of one or more encapsulated e-mail messages.

A more specific object of this invention is to enable a user machine and a server machine separated by a firewall to communicate with each other using an asymmetric pair of connections: a point-to-point connection for a message originating at the user message, and an e-mail communication for a message originating at the server machine.

According to one embodiment of this invention, an electronic communications method is provided between first and second entities over a computer network having an e-mail subsystem. An entity is a machine, or an application, process or routine running on a machine. it is assumed that the first entity (e.g., a server) desires to send a given communication to the second entity (e.g., a client). The method begins upon a connection request from the first entity to the second entity to determine whether a connection can be established between the first and second entities using a first connection preference. For example, the first connection preference is a point-to-point connection protocol. If the connection cannot be established using the first connection preference, a connection to the e-mail subsystem is then opened. The given communication is then encapsulated in an e-mail message. The e-mail message, together with the encapsulated communication, is then transmitted from the first entity to the second entity. The second entity may then respond to the communication, for example, using the first connection preference. In an illustrative embodiment, the first entity is a server and the second entity is an user machine located behind a firewall.

There may be several different reasons why the connection cannot be established between the first and second entities using the first connection preference. Thus, as noted above, one of the entities (i.e. the client) may be located behind a firewall or other security mechanism. Alternatively, the connection between the first and second entities may be poor and unable to support the connection preference specified. In either case, however, the given communication is still transmitted (using the existing e-mail subsystem) at least in one direction. As e-mail communication is typically permitted across a firewall (and/or otherwise possible even in poor network conditions), the first and second entities are thereby able to communicate as if the impediment does not exist.

Generalizing, according to the present invention, the messaging protocol "adapts" to the best connection method available (which may only be e-mail) when a given connection preference cannot be met.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
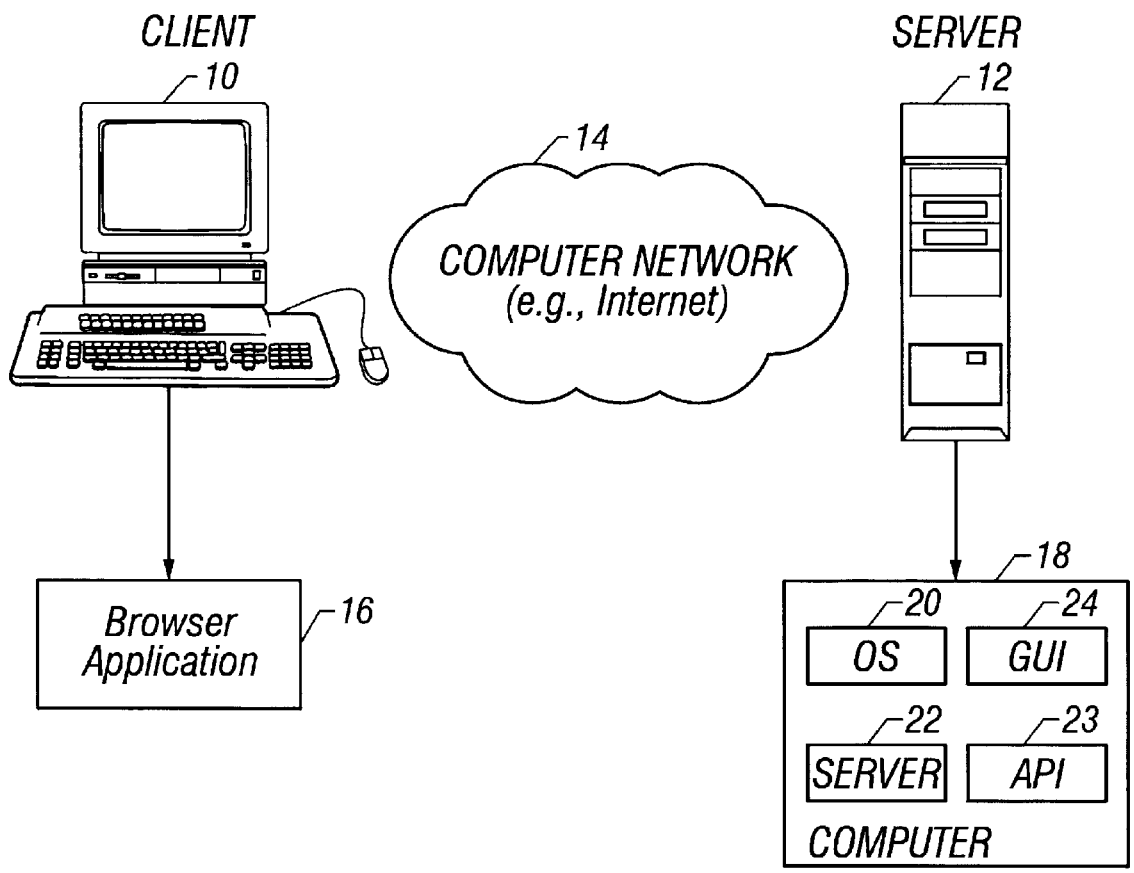
FIG. 1 is a block diagram of a representative Web client and server network environment in which the present invention may be implemented.

The present invention may be implemented conveniently in an Internet or Web-based computer network, although this is not a requirement. Thus, by way of background, a representative Web client/Web server is illustrated in FIG. 1. In particular, a client machine 10 is connected to a Web server platform 12 via a communication channel 14.

For illustrative purposes, channel 14 is the public Internet, an intranet, an extranet or any other known network connection. Web server platform 12 is one of a plurality of servers which are accessible by clients, one of which is illustrated by machine 10. A representative client machine may include a Web browser 16, which is a known software tool used to access the servers of the network. The Web server platform supports files in the form of hypertext documents, graphics and other data type objects. The network path to a server (or to a file on the server) is identified by a Uniform Resource Locator (URL), as is well-known.

A representative Web Server platform 12 comprises a Compaq® computer 18 running the NT Operating System 20 and a Web server program 22, such as Netscape Enterprise Server Version 3.51, that supports interface extensions. The platform 12 also includes a graphical user interface (GUI) 24 for management and administration, and an Application Programming Interface (API) 23 to enable application developers to extend and/or customize the core functionality thereof through software programs known as "plug-ins."

A representative Web client is a personal computer that is x86-, PowerPC®- or RISC-based, includes an operating system such as Microsoft Windows '95 or NT, as well as a browser, such as Netscape Communicator (any version) or Internet Explorer (any version), having native support for application plug-ins. The Web client machine is connectable to the Web server(s) via the Internet, an intranet or some other computer network. The Web client browser typically includes a Java Virtual Machine (JVM), which provides a convenient runtime environment for programs written as Java applications or applets.

Although not required, the present invention is preferably implemented as a Java application or applet (i.e. a set of Java program instructions or code) that is downloaded to or otherwise delivered to a machine (on a tangible medium) and installed in a known manner.

Although the Web client is typically a personal computer, this is not a requirement. The Web client may be any generalized "information appliance" having a processor, an operating system, optionally a browser application, and a means to connect the device to a computer network from which data may be retrieved. Such appliances include, without limitation, a handheld or palmtop device (e.g., running Windows CE 2.0 or higher), a diskless or so-called "network computer", a set-top computer terminal, or the like.

Figure 2:
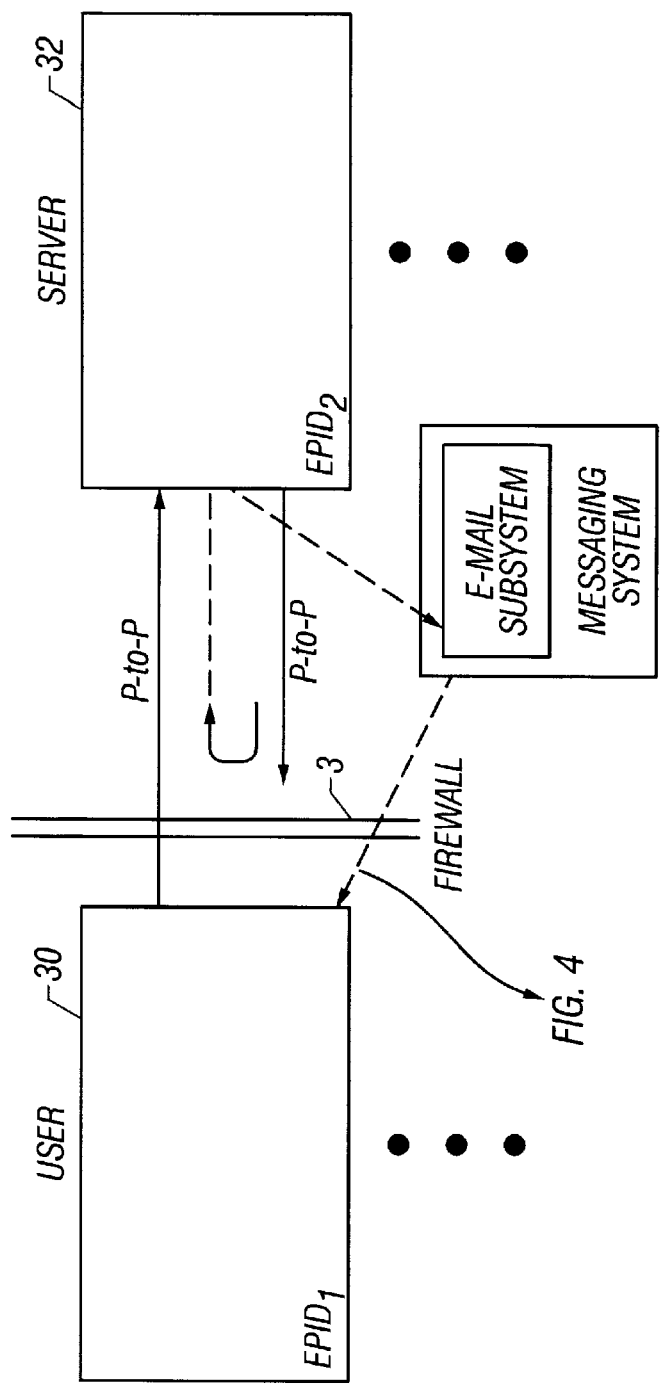
FIG. 2 is a simplified block diagram of the adaptive messaging system of the present invention.

Generalizing, and with reference now to FIG. 2, the adaptive messaging system of the present invention is illustrated in the context of a user machine (e.g., the Web client machine described above) 30 connected to a server machine 32 (e.g., the Web server described above). As can be seen, user machine is located, in this illustrative example, behind a network firewall 33, which is a known security mechanism. A messaging system 35 is provided to facilitate communications between the two entities. This messaging system includes an e-mail subsystem 36.

It is known in the art that network communication endpoints (such as machines 30 and 32) are identified by so-called endpoint identifiers (EPIDs). An EPID is a universally unique reference (UUR) that identifies a network address list comprising a set of one or more point-to-point network addresses (e.g., TCP/IP addresses) and e-mail addresses. To send a message to a specific endpoint (e.g., the client 30), a sender (e.g., server 32) issues a send request to the UUR corresponding to the desired endpoint. The messaging system 35 as illustrated in FIG. 2 then attempts to establish a point-to-point connection using one of the network addresses. If the connection succeeds, the message is sent. This is the known state-of-the-art.

According to the present invention, the known messaging architecture is enhanced to provide so-called adaptive messaging between given endpoints in the network such as machines 30 and 32 (or processes running on these machines). In particular, and continuing with the example described above, if no valid point-to-point connection can be made (e.g., due to the existence of the firewall 33), the desired communication is then encapsulated inside an e-mail attachment. The message is then sent via e-mail using the e-mail subsystem 36 instead of the point-to-point connection. This operation is illustrated conceptually by the dotted lines shown in FIG. 2. In this sense, the communication method "adapts" to the available communication path, namely the e-mail subsystem.

In the preferred embodiment, a receiver of messages awaits the arrival of input data. This input data may be either from a point-to-point connection or from an e-mail attachment. For point-to-point connections, the receiver itself accepts network connections and reads the input data from the network. For e-mail attachments, the input data comes from the local e-mail subsystem.

Thus, continuing with the example shown in FIG. 2, the user machine 30 is usually able to connect to the server 32 but the firewall 33 may prevent the server 32 from connecting to the user machine 30. In this specific case, the adaptive messaging system of the present invention uses an asymmetric pair of communications methods: a point-to-point connection for a message originating at the user machine, and an e-mail for a message originating at the server.

The present invention has particular utility for use in a Web-based automated technical support system wherein a computer at a remote distributed node "under test" (e.g., the client) is connectable to a diagnosis center operating at a server node. For example, such a support system may be implemented over the public Internet or in a corporate enterprise environment (such as an intranet), in either case wherein a plurality of client machines (e.g., desktops) interface with a support center located at a server node through a network. In this system, it is assumed that a problem at a remote distributed node is diagnosed preferably using an iterative problem solving session between the remote distributed node and the server node. An iterative problem solving session refers to set of communications back and forth between the node under test and the diagnostic center by which a solution to a technical problem is reached. A session may involve only one "pass" or iteration although, more typically, several iterations will be required to move toward a corrective action to be implemented at the client node. Using the inventive technique described herein, communications from the server to the node are effected via e-mail as a result of the firewall, while communications from the node to the server may be point-to-point. An illustrative system of this type is described in U.S. Ser. No. 09/073,464 titled "METHOD, SYSTEM AND COMPUTER PROGRAM PRODUCT FOR ITERATIVE DISTRIBUTED PROBLEM SOLVING" filed May 6, 1998 and assigned to the assignee of the present invention. That application is incorporated herein by reference.

Figure 3:
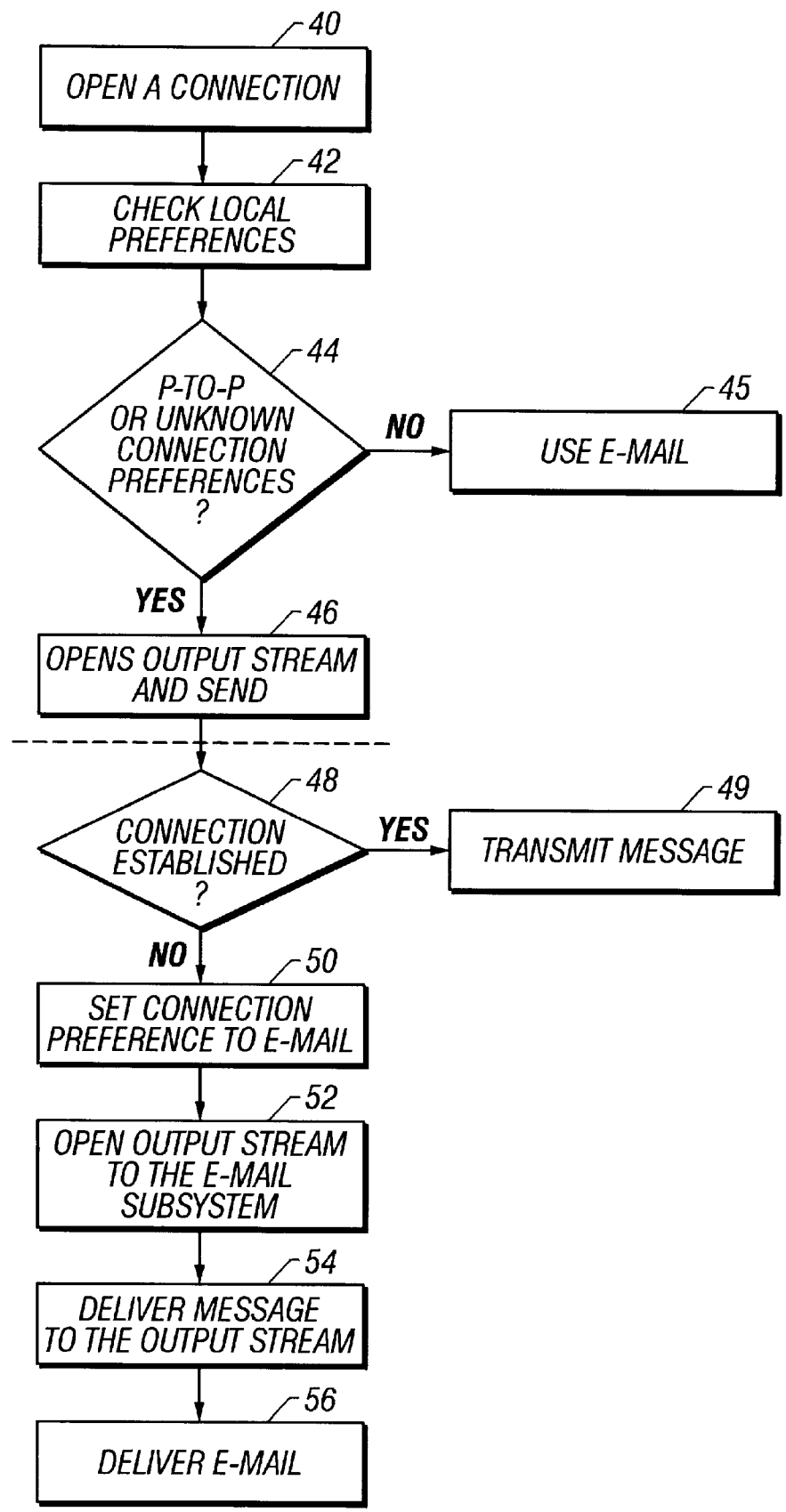
FIG. 3 is a flowchart illustrating a preferred routine for implementing the adaptive messaging protocol of the invention.

A simplified flowchart describing the inventive technique is illustrated in FIG. 3. In a representative embodiment, these steps may be implemented in a computer program executed by a processor running on a computer. Thus, for example, the computer program typically executes as a background task in the messaging system running on the server. It is assumed that local configuration settings have been made to specify point-to-point addresses, e-mail addresses and connection preferences. The routine begins at step 40 upon a determination that the server desires to connect to a receiver (e.g., the user machine). At step 42, the routine checks the local preferences. In the preferred embodiment, the routine honors point-to-point or e-mail settings. At step 44, a test is made to determine whether the local preference is a first connection preference, namely, point-to-point, or is otherwise "unknown". If the result of the test at step 44 is positive, the routine opens an output stream and associates this stream as a point-to-point connection. This is step 46. If the result of the test at step 44 is negative, the local preference is e-mail and that preference is then honored at step 45.

After step 46, the routine continues at step 48 to test if the connection to the receiver has been made. Typically, this step involves evaluating a timer or other flag that is set upon initiating the transmission. If the connection has been established, the routine branches to step 49 and the message is sent. If, however, the outcome of the test at step 46 is negative, the routine continues at step 50 to set the connection preference to the e-mail setting. The system then opens an output stream to the e-mail subsystem at step 52. The message is then sent to the output stream at step 54 for transmission. The message is then delivered via e-mail in step 56. This completes the processing.

Figure 4:
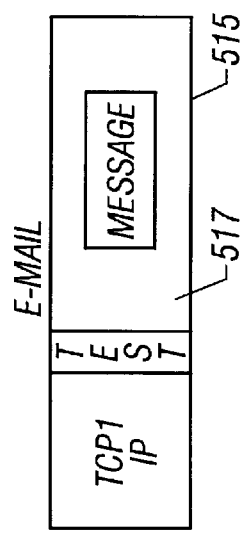
FIG. 4 is a simplified diagram of how a message is encapsulated in an e-mail message to facilitate the adaptive messaging protocol of the invention.

In the preferred embodiment illustrated in FIG. 4, the message 55 intended for the receiver is encapsulated inside an e-mail attachment 57. Thus, the message preferably is sent as an encoded attachment to a standard text-based e-mail message. In many applications, it is desirable for a human operator to receive incoming e-mail in a standard e-mail inbox (e.g. as implemented in Microsoft Outlook Express) and then activate the messages by clicking on the attachment. Alternatively, the present invention may operate in conjunction with an automatic e-mail agent that receives incoming e-mail and triggers the activation of the attachment without human involvement. The e-mail agent would thus run as a background task and await input from either the point-to-point network connection of the e-mail subsystem. When an input was received, the agent would then validate and process the message for display.

In the usual case with the receiving node located behind a firewall, it is anticipated that a response message could be sent from that node back to the server via the point-to-point connection. Thus, one or more communications between the server and the client are typically asymmetric.

Although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, "Web client" should be broadly construed to mean any computer or component thereof directly or indirectly connected or connectable in any known or later-developed manner to a computer network, such as the Internet. The term "Web server" should also be broadly construed to mean a computer, computer platform, an adjunct to a computer or platform, or any component thereof. Of course, a "client" should be broadly construed to mean one who requests or gets the file, and "server" is the entity which downloads the file.

Having thus described my invention, what I claim as new and desire to secure by Letters Patent is set forth in the following claims.

What is claimed is:

1. An electronic communications method between first and second entities over a computer network having an e-mail subsystem, comprising the steps of:

upon a connection request from the first entity to the second entity, determining whether a connection can be established between the first and second entities using a first connection preference;

if the connection cannot be established using the first connection preference, opening a connection to the e-mail subsystem;

encapsulating a communication in an e-mail message; and transmitting the e-mail message, together with the encapsulated communication, from the first entity to the second entity via the e-mail subsystem.

2. The method as described in claim 1 wherein the first and second entities are separated by a firewall.

3. The method as described in claim 1 wherein the first and second entities communicate over a network that does not adequate support the first connection preference.

4. The method as described in claim 3 wherein the first connection preference is a point-to-point connection.

5. The method as described in claim 1 further including the step of having the second entity validate and process the e-mail message to obtain the communication.

6. The method as described in claim 5 further including the step of transmitting a response to the communication from the second entity to the first entity.

7. The method as described in claim 6 wherein the response is transmitted using a connection conforming to the first connection preference.

8. The method as described in claim 1 wherein the first and second entities are computers.

9. The method as described in claim 8 wherein the first entity is a client machine having a Web browser, and the second entity is Web server.

10. An electronic communications method between a server and a client over a computer network having an e-mail subsystem, the client located behind a firewall, comprising the steps of:

upon a connection request from the server to the client, determining whether a point-to-point connection can be established between the server and the client;

if the connection cannot be established using the point-to-point connection, encapsulating a given communication in an e-mail message;

delivering the e-mail message, together with the given communication, from the server to the client via the e-mail subsystem; and sending a response to the communication from the client to the server via a point-to-point connection.

11. The method as described in claim 10 wherein the computer network is the public Internet and the client includes a Web browser.

12. The method as described in claim 10 wherein the computer network is an intranet and the client includes a Web browser.

13. The method as described in claim 10 further including the step of validating and outputting the communication to a recipient at the client prior to the step of sending the response.

14. A computer program product in a computer-readable medium for facilitating electronic communications between a server and a client in a computer network having an e-mail system, the computer program product executable in the server and comprising:

means operative upon a connection request from the server to the client for determining whether a point-to-point connection can be established between the server and the client;

means responsive to the determining means for opening a connection to the e-mail system if the point-to-point connection cannot be established; and means for associating to an e-mail message a given communication to be delivered from the server to the client.

15. The computer program product as described in claim 14 wherein the means for associating attaches the given communication to the e-mail message.

16. The computer program product as described in claim 14 wherein the server is a Web server and the computer network is the public Internet.

* * * * *